Patented Nov. 1, 1949

2,486,542

UNITED STATES PATENT OFFICE 2,486,542

SIMULTANEOUS HALOALKYLATION AND REDUCTION OF ORGANIC COMPOUNDS

Leonard Weisler and Albert J. Chechak, Rochester, N. Y., assignors to Distillation Products, Inc., Rochester, N. Y., a corporation of Delaware No Drawing. Application May 20, 1949, Serial No. 94,536

15 Claims. (Cl. 260—333)

This invention has for its object to provide a new and useful method for the haloalkylation and reduction of organic compounds containing not more than two benzenoid rings. Another object is to provide an improved process for the conversion of tocopherol material characterized by having at least one aromatic hydrogen atom on the nucleus thereof to alpha-tocopherol. Other objects will appear hereinafter.

These and other objects are accomplished in accordance with our invention which includes the haloalkylation of an aromatic compound by reacting said compound with an aldehyde and hydrogen halide in the presence of stannous chloride which reduces the haloalkylated compound simultaneously with the formation of said haloalkylated compound.

In the following examples and description we have set forth the preferred embodiment of our invention but it is understood this is in illustration and not in limitation thereof.

It is known that the low potency tocopherols, beta-tocopherol, gamma-tocopherol and delta-tocopherol, which are characterized by having at least one aromatic hydrogen atom on the nucleus can be converted to alpha-tocopherol by chloromethylation and reduction. This has been accomplished in the past by dissolving such a low potency tocopherol, as for example gamma-tocopherol, in ether, or suitable solvent, adding aqueous formaldehyde, concentrated hydrochloric acid, and stirring for 2½ hours. At the end of this chloromethylation period, zinc dust is added directly to the reaction mixture and reduction allowed to proceed for 30 minutes. The mixture is then washed with water and the ether solution of tocopherol dried and evaporated. The alpha-tocopherol is then concentrated by molecular distillation.

Instead of the two-stage process consisting of chloromethylation and separate reduction formerly employed, we now carry out the chloromethylation and reduction reactions simultaneously in a single-stage process. This objective is accomplished by using stannous chloride as the reducing agent and introducing it initially into the reaction mixture. Stannous chloride acts selectively to reduce the substituent haloalkyl group introduced into the material being haloalkylated while leaving reactants such as formaldehyde unchanged. Consequently, the haloalkylation is allowed to proceed unhindered and simultaneously therewith reduction of the haloalkylated product by stannous chloride takes place.

The chloromethylation reaction involves the replacement of the hydrogen atom in the 5 position of gamma-tocopherol by a substituent and is accomplished in the case of a methyl group, for example, by the reaction of the gamma-tocopherol with an ethereal solution of formaldehyde in the presence of hydrogen chloride or hydrochloric acid. This results in the introduction of a chloromethyl group. This group is then converted into the methyl group by a stannous chloride and hydrochloric acid reduction procedure. The presence of stannous chloride in the initial reaction mixture condenses these two reactions to a single-stage process. The introduction of a substituent can be accomplished using hydrogen halides other than hydrogen chloride, such as hydrogen bromide or iodide. Hydrogen fluoride is operable but is less preferably employed because of difficulties in handling it. Instead of using formalin, a polymer of formaldehyde, such as paraformaldehyde, may be used to introduce the chloromethyl group. Chloromethyl ether, prepared by introducing hydrogen chloride gas into a mixture of paraformaldehyde and methanol, may also be used. Other groups than methyl may be introduced using other reactants of the type mentioned. Thus, the ethyl group can be introduced using paraldehyde or diethyl formal instead of dimethyl formal. It is to be understood that all such reactions which involve introduction of a halo-alkyl radical shall be included within the scope of our invention and within the meaning of the term "haloalkylation" as used herein.

Similarly, beta-tocopherol is treated in accordance with this invention to introduce a hydrocarbon group in the 7 position on the nucleus; and delta-tocopherol, which has aromatic hydrogen atoms in both the 5 and 7 positions, is treated to replace either or both of such hydrogen atoms with a hydrocarbon group.

The use of a solvent increases the yield of alpha-tocopherol but the reaction may be carried on satisfactorily in the absence of a solvent. The use of stannous chloride as the reducing agent in a single-stage process is not limited to tocopherol compounds but is applicable to haloalkylation of aromatic compounds generally.

In the following examples we give the preferred manner of effecting conversion in accordance with our invention but it is to be understood that these are given in illustration and not in limitation thereof.

Example 1

To a solution of 10 g. of gamma-tocopherol concentrate in 75 cc. of ether is added 1.35 cc. of formalin and 20 cc. of concentrated hydrochloric acid containing 3.9 gms. of stannous chloride. The mixture is stirred for two hours at room temperature and worked up by washing with water, dried, and evaporated. The mixture resulting from the reaction is distilled in a molecular still between 140–220° C. at 7μ to recover tocopherol. The gamma to alpha conversion efficiency is about 70%.

Example 2

To a solution of 10.8 g. (0.1 mole) of anisole in 100 cc. of ether, add 140 cc. of concentrated hydrochloric acid, 7.5 cc. of 40% formalin and 22.5 gms. of stannous chloride. The mixture is stirred for two hours at 5–10° C. and worked up by washing the ether solution with water and filtering it through a column of "Doucil," a synthetic sodium aluminum silicate to remove the last traces of zinc chloride. The ether is removed and 4-methoxy toluene separated from the residue by fractional distillation.

Example 3

A mixture of 300 g. (3.35 moles) of benzene, 30 g. (1 mole) of paraformaldehyde, 30 g. of pulverized zinc chloride, and 225 g. stannous chloride is stirred and heated at 60° C. At this temperature a rapid stream of hydrogen chloride is passed into the reaction mixture for about 25 minutes. The organic layer is worked up by washing with water, dilute sodium carbonate and then passed thru a column of "Doucil," a synthetic sodium aluminum silicate to remove zinc chloride. By fractional distillation toluene is isolated from the reaction mixture along with other by-products.

Example 4

To a solution of 10 g. of gamma-tocopherol concentrate in 75 cc. of ether, add 1 gram of acetaldehyde and 6 grams of stannous chloride. This mixture is stirred for 1½ hours at room temperature during which time hydrogen chloride gas is bubbled through. The mixture is then washed with water, dried, and evaporated. The residue is distilled in a molecular still between 140–220° C. at 7μ to recover a tocopherol with an ethyl group in the 5 position.

Similar results are obtained employing any organic material capable of undergoing haloalkylation and including beta-tocopherol and delta-tocopherol as well as gamma-tocopherol.

This application is a continuation-in-part of our application Serial No. 667,736 filed May 6, 1946, and now abandoned.

While the invention has been described in considerable detail with reference to certain preferred embodiments thereof, it will be understood that variations and modifications may be effected within the spirit and scope of the invention as defined in the appended claims.

What we claim is:

1. The process which comprises haloalkylating the 5 position of gamma-tocopherol by reacting therewith an aldehyde and a hydrogen halide and simultaneously reducing the resulting substituent haloalkyl radical by means of stannous chloride, said aldehyde, hydrogen halide and stannous chloride being present in admixture during said reacting.

2. The process which comprises chloroalkylating the 5 position of gamma-tocopherol by reacting therewith an aldehyde and hydrogen chloride and simultaneously reducing the resulting substituent chloroalkyl radical by means of stannous chloride, said stannous chloride being present in the reaction mixture during said chloroalkylating.

3. The process which comprises chloromethylating the 5 position of gamma-tocopherol by reacting therewith a compound selected from the class consisting of formaldehyde and paraformaldehyde, and simultaneously reducing the resulting substituent chloromethyl radical by means of stannous chloride, said compound, hydrogen chloride and stannous chloride being present in admixture during said reacting.

4. The process which comprises haloalkylating an aromatic compound containing not more than two benzenoid rings by reacting therewith an aldehyde and a hydrogen halide, and simultaneously reducing the resulting substituent haloalkyl radical by means of stannous chloride, said aldehyde, hydrogen halide and stannous chloride being present in admixture during said reacting.

5. The process which comprises chloroalkylating an aromatic compound containing not more than two benzenoid rings by reacting with said compound an aldehyde and hydrogen chloride, and simultaneously reducing the resulting substituent chloroalkyl radical by means of stannous chloride, said stannous chloride being present in the reaction mixture during said chloroalkylating.

6. The process which comprises chloromethylating an aromatic compound containing not more than two benzenoid rings by reacting therewith hydrogen chloride and a member selected from the class consisting of formaldehyde and paraformaldehyde, and simultaneously reducing the resulting substituent chloromethyl radical by means of stannous chloride, said stannous chloride being preesnt in the reaction mixture during said chloromethylating.

7. The alkylation of the 5 position of gamma-tocopherol by reacting therewith an aldehyde and a hydrogen halide in the presence of stannous chloride.

8. The methylation of the 5 position of gamma-tocopherol by reacting therewith formaldehyde and a hydrogen halide in the presence of stannous chloride.

9. The addition of a methyl group to the 5 position of gamma-tocopherol by contacting a solution of gamma-tocopherol with formaldehyde and hydrogen chloride in the presence of stannous chloride.

10. The alkylation of the 7 position of beta-tocopherol by reacting therewith an aldehyde and a hydrogen halide in the presence of stannous chloride.

11. The methylation of the 7 position of beta-tocopherol by reacting therewith formaldehyde and a hydrogen halide in the presence of stannous chloride.

12. The addition of a methyl group to the 7 position of beta-tocopherol by contacting a solution of beta-tocopherol with formaldehyde and hydrogen chloride in the presence of stannous chloride.

13. The alkylation of at least one of the 5 and 7 positions of delta-tocopherol by reacting therewith an aldehyde and a hydrogen halide in the presence of stannous chloride.

14. The methylation of the 5 and 7 positions of delta-tocopherol by reacting therewith formaldehyde and a hydrogen halide in the presence of stannous chloride.

15. The addition of a methyl group to the 5 and 7 positions of delta-tocopherol by contacting a solution of delta-tocopherol with formaldehyde and hydrogen chloride in the presence of stannous chloride.

LEONARD WEISLER.
ALBERT J. CHECHAK.

No references cited.